United States Patent [19]
Heard

[11] 3,713,276
[45] Jan. 30, 1973

[54] POLLUTION CONTROL APPARATUS

[76] Inventor: John P. Heard, 1501 Doran, Odessa, Tex. 79760

[22] Filed: May 19, 1971

[21] Appl. No.: 144,763

[52] U.S. Cl. ..................55/222, 55/223, 55/229, 55/240, 110/119, 261/126, 261/DIG. 9
[51] Int. Cl. ..............................................B01d 47/12
[58] Field of Search....................55/220, 222–224, 55/229, 240, 244, 248–249, 255–256, 260; 110/10, 119; 261/126, DIG. 9

[56] References Cited

UNITED STATES PATENTS

| | | | |
|---|---|---|---|
| 420,718 | 2/1890 | Cochrane | 55/260 X |
| 679,666 | 7/1901 | Clawson | 261/126 |
| 1,053,349 | 2/1913 | Blauvelt et al. | 55/222 X |
| 1,169,764 | 2/1916 | Brassert | 55/223 X |
| 1,894,744 | 1/1933 | Hawley | 55/223 |
| 2,587,416 | 2/1952 | Vedder | 55/240 X |

FOREIGN PATENTS OR APPLICATIONS

| | | | |
|---|---|---|---|
| 268,379 | 8/1970 | U.S.S.R. | 55/240 |
| 575,293 | 4/1958 | Italy | 55/244 |
| 1,019,279 | 11/1957 | Germany | 55/229 |

*Primary Examiner*—Frank W. Lutter
*Assistant Examiner*—Vincent Gifford
*Attorney*—Marcus L. Bates

[57] ABSTRACT

Apparatus for separating suspended solids from a stream of gas, and for evaporating water, comprising a vertically disposed tower made up of a plurality of sections, each of which have associated therewith a tent-like structure for subjecting a stream of gas to a washing action. The lowermost section has a combustion chamber and boiler associated therewith. Flue gases from the combustion process are admixed with steam from the boiler and flow along a tortuous path up through the various sections of the tower.

As the gases ascend the tower, various portions thereof are split from the main flow and are subjected to a washing action, with the final remaining flow of gases emerging from the uppermost portion of the tower.

7 Claims, 8 Drawing Figures

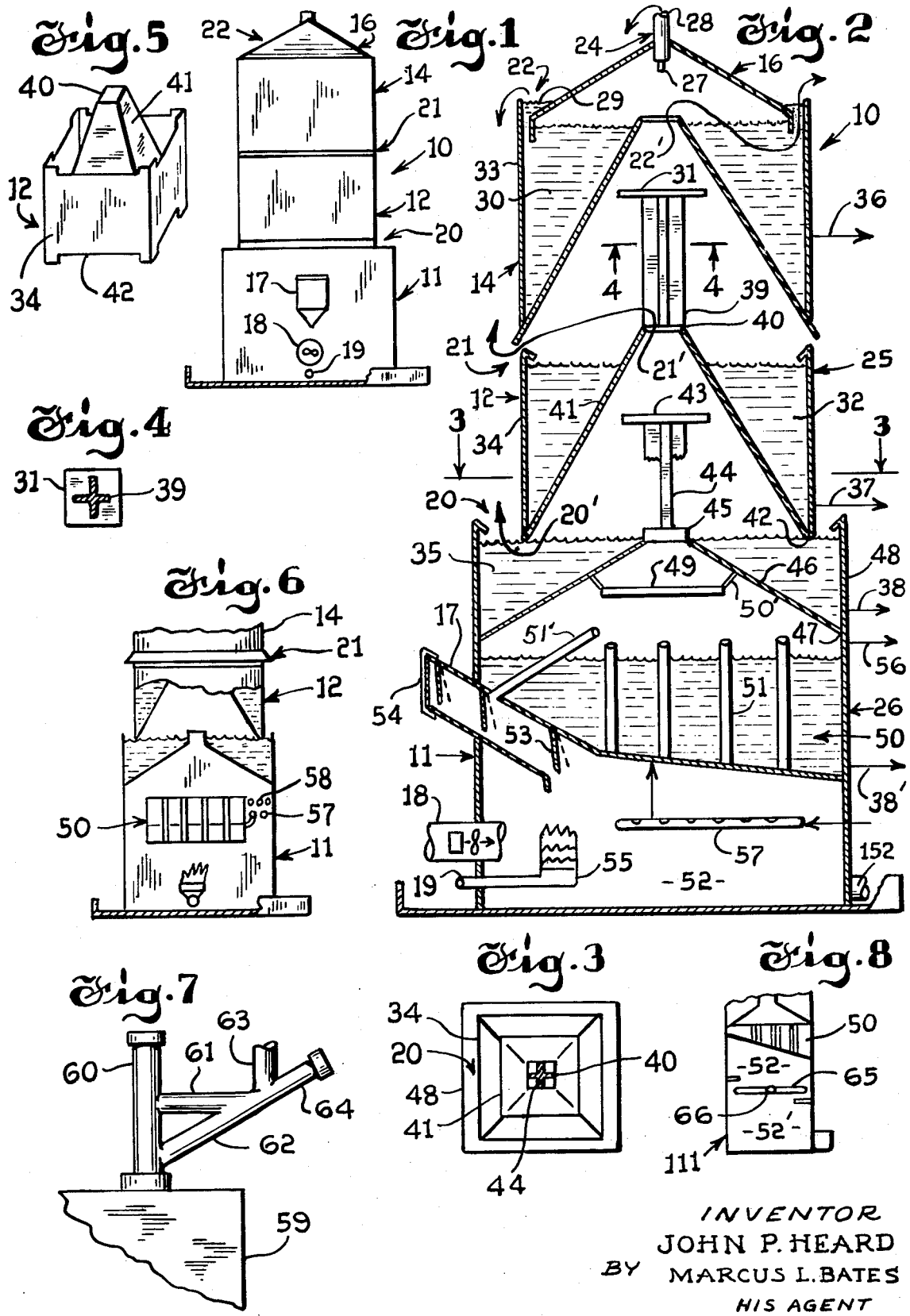

POLLUTION CONTROL APPARATUS

BACKGROUND OF THE INVENTION

Numerous prior art methods and apparatus have been suggested for removing suspended solids, or small particles, from flue gases in order to enable the economical disposal of refuse by burning. Most of the prior art apparatus for accomplishing this result are extremely complex and high in cost. Furthermore, after the high initial cost, the expense of operating the apparatus is often considered prohibitive for the disposal of refuse by the average commercial business. Accordingly, many find it expedient to haul refuse to a municipal disposal unit where the refuse is disposed of by more exotic and complex means.

It is therefore desirable to provide apparatus for disposing of refuse and other material which may be considered to be a pollution problem.

It is desirable that such apparatus be low in cost, simple in operation, and inexpensive to operate.

It is furthermore desirable that the apparatus have the capability of disposing of refuse by the combustion process, and at the same time it is desired to be able to dispose of contaminated liquids such as water.

SUMMARY OF THE INVENTION

In general, the present invention comprehends the disposal of solids by combusting the solids in order to chemically change its composition into another form which is considered to be compatible with our environment. At the same time, the apparatus provides a means by which waste water having undesirable solids dissolved therein can be efficiently evaporated into the atmosphere so as to reduce the volume of the liquid which must be disposed.

More specifically, the present invention comprehends apparatus for separating suspended solids from a stream of gas, and for evaporating water by the provision of a vertically disposed tower made up of a plurality of sections, with the lowermost section having associated therewith a combustion chamber and a boiler so that the heat of combustion of material burned in the combustion chamber evaporates the water. The water evaporated by the boiler and flue gases formed by the combustion process are admixed together in a first separation chamber, and continues to flow to a second separation chamber. A portion of the flue gases are cleaned as they are exhausted through an annular washer into the atmosphere, while the remaining gases are conveyed to another chamber and subjected to further scrubbing action prior to their emerging from the structure.

The various scrubbers are provided by a tent-like structure which forms a reservoir for holding water, with the lower depending end of one reservoir cooperating with the uppermost portion of another reservoir so as to provide for the scrubbing action.

It is therefore an object of this invention to provide improvements in pollution control apparatus.

Another object of the present invention is to provide improvements in apparatus for scrubbing gases and for evaporating water from waste liquids.

A further object of this invention is to provide an economical refuse disposal unit which is rugged in design, simple in operation, and low in cost.

A still further object of this invention is to provide improvements in pollution control apparatus which has means associated therewith for conveniently changing the capacity of the apparatus.

These and various other objects and advantages of this invention will become readily apparent to those skilled in the art upon reading the following detailed description and claims and by referring to the accompanying drawings. The above objects are attained in accordance with the present invention by the provision of a combination of elements which are fabricated in a manner substantially as described in the above abstract and summary of the invention.

BRIEF DESCRIPTION OF THE DRAWINGS

FIG. 1 is a side elevational view which discloses the preferred form of the present invention.

FIG. 2 is an enlarged, vertical, part cross-sectional view of the apparatus seen in FIG. 1;

FIG. 3 diagrammatically sets forth a cross-sectional view taken along line 3—3 of FIG. 2;

FIG. 4 is a cross-sectional view of a part of the apparatus disclosed in FIG. 2 which has been taken along line 4—4 of FIG. 2;

FIG. 5 is a reduced perspective view of a portion of the apparatus seen in FIGS. 1 and 2;

FIG. 6 is a fragmentary, part cross-sectional, part diagrammatical view of the apparatus seen in FIG. 1;

FIG. 7 is a schematical representation of a variation of the present invention; and FIG. 8 is a schematical representation of a modification of a portion of the apparatus disclosed in FIG. 2.

DETAILED DESCRIPTION OF THE PREFERRED EMBODIMENT

As seen in FIG. 1, in conjunction with FIGS. 2–6, there is disclosed apparatus for separating solids from a stream of gas and for evaporating water, comprising; a vertically disposed tower 10 made up of a lowermost section 11, a central section 12, and an uppermost section 14. A tent-like closure means 16 forms the uppermost wall portion or closure means for the apparatus.

A source of air 18, preferably in the form of a conventional blower, provides combustion air into the lowermost section, while conduit 19 provides a source of hydrocarbons for initiating or maintaining combustion within the lower section.

Between the lowermost and central section there is provided a circumferentially extending trough which forms an annular washer 20. The washer extends about the entire outer periphery of the tower.

A water curtain 21 is formed between the spaced apart adjacent edge portions of the central and upper sections, and, for purposes of illustration is shown to be square in configuration. A second annular washer 22 is formed between the upper closure means and the upper terminal end of the upper section. Overflow pipe 24 is located at the apex of the closure means, and provides two different streams of make-up water, as will be more fully appreciated later on in this disclosure.

As particularly seen in FIG. 2, side wall 25 of the central section is vertically aligned with the upper section and inwardly disposed of the outer wall 26 of the lower section. The lower end 27 of the over flow pipe emits water therefrom while a portion of the water which flows thereto overflows therefrom as indicated by the arrow near numeral 28. The water overflows from 28 and accumulates as indicated by the liquid level at numeral 29, so as to maintain chamber 30 of the uppermost reservoir properly filled with liquid. The interior 32 of the central reservoir must be connected to an external source of liquid.

Water overflows the upper peripheral edge portion of the upper section as indicated at 22, and flows down and about the entire outer peripheral wall surface of the upper and central section so as to form the before mentioned water curtain at 21. The water continues to flow along the wall at 34 and provides a water source at the lowermost reservoir 35. Hence, it may be said that the liquid at 35 represents residual water, since it commenced at 24 and is accumulated in the lowermost reservoir.

From the lower extremity of each of the reservoirs there is connected an outflow pipe in the illustrated manner of numerals 36, 37, 38, and 38', which enables separated solids to be removed from the lower portion of each of the reservoirs.

Upstanding member 39 is attached to apex 40 of the intermediate reservoir so as to maintain horizontal plate member 31 spaced apart from each of the adjacent apexes and also away from the inner wall surface of the reservoir. The inner wall 41 of the reservoir is seen to downwardly and outwardly depend into engagement with the sidewall 34 to form a lowermost edge portion as indicated by the numeral 42.

Plate member 43 is supported by member 44 in a manner similar to the previously described plate member. Outlet 45 defines the upper terminal end portion of the inside wall of the lowermost reservoir. The lower end portion of wall 46 is connected at 47 to the outer wall surface of the lower section. The edge portion 47 is spaced above the boiler. Plate 49 is suspended within the first separation chamber by the spaced apart support members 50'.

Make-up water flows into the illustrated boiler at 50. A multiplicity of heat conducting hollow tubes 51 are placed in communication with the combustion chamber 52 and the first separation chamber.

The before mentioned refuse charge chute has a plurality of swinging doors 53 hinged to the upper wall surface thereof and prevents smoke and heat from returning towards closure member 54. Conduit 51' prevents accumulation of smoke within the chute. A refuse outlet 152 is also provided at the lower extremity of the lower section 11.

Burner 55 initiates combustion of refuse placed within the combustion chamber. Where deemed desirable, a larger burner system can be included in the apparatus so as to enable disposal of water when there is a limited quantity of refuse which can be used as a source of heat energy.

The boiler includes an overflow conduit means 56 which prevents water from overflowing into the upper free end of tubes 51. An apertured evaporation tube 57 is connected to a convenient supply of water so as to additionally charge the flue gases with saturated steam. The evaporation tube can alternatively be placed in the illustrated position seen at 58 in FIG. 6, if desired.

An alternate use of the apparatus is disclosed in FIG. 7 wherein numeral 59 represents a tank of acid which is being boiled, with fumes emerging at 60. The fumes travel along conduit 61, where the corrosive condensate is partially returned at 62. Numeral 63 indicates a conduit which can be connected at 45 (FIG. 2) to structure made in accordance with the present invention. In this instance the structure located below edge portion 47 of the lowermost reservoir can be dispensed with if desired. Numeral 64 of FIG. 7 illustrates a clean-out hole.

As seen illustrated in FIG. 8, the combustion chamber 52 in lower section 111 can be provided with a grate 65 which is journaled at 66 so as to enable non-combusted material left on the grate to be dumped into chamber 52' thereof, and subsequently removed.

In operation, burner 55 is ignited with fuel and air being supplied thereto by means of conduit 19 so as to provide a burner which is operable independently of the atmosphere contained within the combustion chamber. Water flows at 27, 28 so as to fill the upper and lower reservoirs. The boiler water level is properly adjusted as well as the level within the central reservoir.

Refuse is charged into the chute where it is ignited by the burner. The flue gases rise up through and around the boiler, causing the water therein to be evaporated, with the saturated steam and flue gases mixing together within the first separation chamber as they follow a tortous path about plate 49 and through the outlet 45 thereby ultimately causing the solids to be wetted and removed. As the hot gases impinge upon the interior wall surface of the lower reservoir, the water therein is heated to its boiling point, causing further generation of steam which is admixed with the flue gases.

The lower end portion 42 of the central reservoir is placed between and below the upper edge portion of the spaced apart walls forming the central reservoir, so as to form an annular washer, similar to a water trap in some respects, and which acts in the nature of a bubble cap associated with a distillation column, in that the portion of flue gases flowing therethrough are subjected to a washing or scrubbing action.

The remaining gases continue to flow upwardly into the second separation chamber, following a tortous path, as they continue to flow through apex 40 and into the third separation chamber. A portion of the steam laden gases flow through the water curtain at 21 while the remainder of the gases flow on to the fourth separation chamber, and through the annular washer 22'.

As the solids are removed from the flue gases, they are deposited within the various reservoirs and must occasionally be removed therefrom.

The flow rate at 27 is regulated so as to cause water to impinge upon plate 31, with the residual water accumulating within the central reservoir. Should chamber 35 flood, the excess water is retained in the annular trough affixed to the lower end of the lowermost chamber.

Any desired number of central sections 12 may be series connected by vertically superimposing one upon another. The central and upper sections are preferably square in cross-section while the lower section is preferably round, although those skilled in the art will realize that either may be made into one or the other configurations, as deemed desirable. Accordingly, the annular washer and the water curtain may be square or round in form.

I claim:

1. Apparatus for separating suspended solids from a stream of gas, and for evaporating water, comprising, in combination:

a vertically disposed tower made up of a lowermost, central, and uppermost section;

said lowermost section having a combustion chamber and a steam generating boiler therein;

a first, second, and third reservoir, each said reservoir being defined by an outer wall which encloses an inner wall with said outer and inner walls having a lower edge portion connected together and an upper edge portion spaced apart from one another so as to form a water containing chamber therebetween, said inner wall being upwardly and inwardly sloped with the upper edge portion thereof terminating in a gas and steam outlet;

said first reservoir being disposed above said boiler with the inside peripheral wall surface of the reservoir forming at least part of a first separation chamber, said separation chamber being in communication with said combustion chamber and said boiler outlet;

said central section being comprised of at least one said second reservoir, with the lower edge portion of said second reservoir being disposed below and spaced between the upper edge portion of said inner and outer walls of said first reservoir so as to form an annular washer therebetween; the inside peripheral wall surface of the said second reservoir cooperating with the central section to form a second separation chamber therebetween;

said uppermost section being comprised of said third reservoir, with the lower edge portion of said third reservoir being spaced apart from the upper edge portion of said outer wall so as to form a gas outline means therebetween; the inside peripheral wall surface of the said third reservoir cooperating with the central section to form a third separation chamber therebetween;

a tent-like structure having an apex at the top and a lower peripheral edge portion, said lower edge portion being affixed to and spaced between and located below the upper peripheral edge portion of the inner and outer walls forming the third reservoir; water feed means at said apex for enabling water to flow into said third reservoir and about the outer wall surface of said upper and central sections forming a water curtain across said outlet means, and into said first reservoir;

means for maintaining the water level within the boiler at a predetermined height;

and means for removing water and solids from the lower extremity of said boiler and said first, second, and third reservoir, whereby:

flue gases are scrubbed by steam and water as they flow from said combustion chamber, through said first separation chamber, through said annular washers and curtain.

2. The combination of claim 1, and further including a flow diverger means located in said first, second, and third separation chambers; means flow connected to said apex for causing water to impinge upon the flow diverger located in said third separation chamber.

3. The combination of claim 2, wherein said flow diverger is a plate member, means supporting said plate member from an adjacent reservoir, said plate member being disposed in spaced apart relationship with respect to the sidewalls and apex of the reservoirs.

4. The combination of claim 1, wherein said reservoirs are comprised of an outer housing having four side walls connected together to form a square configuration when viewed in cross-section.

5. The combination of claim 1 wherein said central section is comprised of a plurality of said second reservoirs;

each said second reservoir being of a similar size so as to enable one to be removably superimposed upon another to thereby enable the tower height to be changed.

6. The combination of claim 1 wherein there is additionally included a charge chute and a refuse outlet;

a plurality of trap means for admitting refuse while precluding flow of flue gases therethrough.

7. The combination of claim 6, and further including a flow conduit means flow connected from said chute to said first separation chamber for conducting the flow of flue gases from said chute into said first separation chamber.

* * * * *

UNITED STATES PATENT OFFICE
CERTIFICATE OF CORRECTION

Patent No. 3,713,276    Dated JANUARY 30, 1973

Inventor(s) JOHN PAUL HEARD

It is certified that error appears in the above-identified patent and that said Letters Patent are hereby corrected as shown below:

Column 5, line 37, substitute --let-- for "line".

Signed and sealed this 29th day of May 1973.

(SEAL)
Attest:

EDWARD M. FLETCHER, JR.
Attesting Officer

ROBERT GOTTSCHALK
Commissioner of Patents